United States Patent [19]

Robinson

[11] 4,373,084
[45] Feb. 8, 1983

[54] SULFUR-MODIFIED POLYPROPYLENE ETHER GLYCOLS, A METHOD FOR PREPARING THEM, AND POLYURETHANES PREPARED THEREFROM

[75] Inventor: Ivan M. Robinson, Wilmington, Del.

[73] Assignee: E. I. Du Pont de Nemours and Company, Wilmington, Del.

[21] Appl. No.: 281,199

[22] Filed: Jul. 7, 1981

[51] Int. Cl.$^3$ .......................... C08G 18/52; C09K 3/00
[52] U.S. Cl. ....................................... 528/79; 521/174; 521/177; 252/182; 528/76; 568/46; 568/47; 568/580; 568/581; 568/617
[58] Field of Search ...................... 568/46, 47; 528/76, 528/79; 521/174, 177; 252/182

[56] References Cited

U.S. PATENT DOCUMENTS

| | | | |
|---|---|---|---|
| 2,582,605 | 1/1952 | Richter et al. | 260/608 |
| 2,900,368 | 8/1959 | Stilmar | 568/46 |
| 2,998,413 | 8/1961 | Holtschmidt et al. | 260/77.5 |
| 3,005,803 | 10/1961 | Holtschmidt et al. | 260/79 |

*Primary Examiner*—H. S. Cockeram

[57] ABSTRACT

Polypropylene ether glycol is modified so that it contains 1–25%, by weight of $\beta,\beta'$-dihydroxyalkyl sulfide moieties.

These modified polypropylene ether glycols have enhanced resistance to degradation by heat and oxygen.

The invention also relates to a method of making the modified PPG's, to their use as stabilizers against the degradation of the polyether chain, and to polyurethanes made with them.

10 Claims, No Drawings

SULFUR-MODIFIED POLYPROPYLENE ETHER GLYCOLS, A METHOD FOR PREPARING THEM, AND POLYURETHANES PREPARED THEREFROM

DESCRIPTION

Technical Field

This invention relates to polypropylene ether glycol (PPG), which has been modified so that it contains sulfur-containing moieties in its polymer chain. It is more particularly directed to such a PPG modified to contain dehydrated β,β'-dihydroxyalkyl sulfide (HAS) moieties in its chain.

The invention also relates to a method of making the modified PPG's, to their use as stabilizers against the degradation of the polyether chain, and to polyurethanes made with them.

BACKGROUND AND SUMMARY OF THE INVENTION

Polyurethanes have been known and used for many years, and the basic general chemistry for their preparation, the reaction of a polyol, a polyisocyanate and a chain extender, is fully documented.

A polyol frequently used for this purpose is PPG, which is well known to be degraded by exposure to oxygen, light and heat. It has been the general practice to guard against such degradation by blending with the PPG an external stabilizer such as a phenolic, an amine or a sulfur compound.

It has now been found, according to the invention, that the stabilization can be more effectively and efficiently achieved if the PPG is modified so that it contains in its chain 1–25%, by weight, preferably 3–15%, of moieties represented by the structure

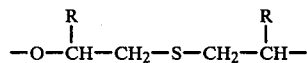

where R is hydrogen, an alkyl radical of 1–3 carbon atoms or phenyl, and the oxygen atom is linked to a hydrogen atom or a carbon atom.

Preferably, the modified PPG has an oxygen/sulfur atom ratio of 3/1 or greater, even more preferably 5-60/1.

It has been found, according to the invention, that the stabilization against degradation can also be achieved if the unmodified PPG to be used is physically blended with about 0.4–20%, by weight, of the modified PPG.

In addition, the method for preparing the modified PPG of the invention can be used to increase the molecular weight of the PPG by coupling polymer chain segments with HAS moieties.

It has also been found that PPG modified according to the invention shows significantly better resistance to acid-catalyzed depolymerization and to oxidative degradation at high temperatures than unmodified PPG.

DETAILED DESCRIPTION OF THE INVENTION

The modified PPG of the invention is made by catalytically reacting a PPG with an HAS.

The PPG used can be any of those commercially available, or can be prepared by the well-known method of polymerizing propylene oxide, using an alkaline catalyst and a glycol or polyol initiator. Preferably, the PPG has a number average molecular weight of 400–6000, more preferably 650–3000.

Number average molecular weight is determined by first determining the hydroxyl number of the sample by titrating it with acetic anhydride according to ASTM-D-1638 and then converting this number to number average molecular weight according to the formula

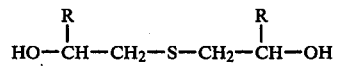

where n is the hydroxyl functionality of the sample.
The HAS used is represented by the structure $$HO-\overset{R}{\underset{|}{CH}}-CH_2-S-CH_2-\overset{R}{\underset{|}{CH}}-OH$$

where R is hydrogen, an alkyl radical of 1-3 carbon atoms, or phenyl.

The HAS preferred for use is β,β'-dihydroxyethyl sulfide.

Any such HAS not available in the marketplace can be made by the well-known reaction of hydrogen sulfide and an alkylene oxide.

The preparative reaction is conducted in a mixture of PPG and HAS. The relative amounts of HAS and PPG used are dictated by the weight of HAS moieties desired in the product PPG. These amounts can be easily calculated using the principles of stoichiometry. In general, one uses 0.5–6 moles of HAS for each mole of PPG, preferably 1–2 moles.

The catalyst used can be any heterogeneous or homogeneous acid catalyst stronger than $H_3PO_4$. It is preferably an alkyl- or aryl sulfonic acid such as methanesulfonic acid, or one of the strongly acidic cationic ion-exchange resins bearing $-SO_3H$ groups, insoluble in the reaction medium. "Insoluble" means that the amount of resin which dissolves in the medium under reaction conditions will give the modified PPG product an acid number of no greater than 0.05 mg of KOH per gram. The nature of the "backbone" of the resin is unimportant. The most common of the commercially available resins of this type have backbones which are of the polystyrene type, but resins having other backbones can be used.

Preferred among the polystyrene type resins, and preferred for use according to the invention, is one sold by the Rohm & Haas Company of Philadelphia, Pa. as Amberlyst® XN-1010. This macroreticular resin has a cation exchange capacity of 3.1 milliequivalents per gram, a surface area of 450 square meters per gram, a porosity of 41%, and a mean pore diameter of 0.005 micron.

The catalyst is used at a concentration of 0.1–10%, by weight of the PPG, preferably 2–5%.

The preparation is begun by placing the PPG, about 10% by weight of the total HAS to be used, and the catalyst in a vessel and bringing the resulting mixture to a temperature of 130°–170° C., preferably about 150° C., and holding it at that temperature, with stirring, until the HAS has been consumed, as shown by periodic sampling and analysis by gas chromatography. The rest of the HAS to be used is slowly added to the reaction mass during this period, continuously or in small increments.

The water formed by the reaction can be removed from the reaction mass by vacuum distillation or by sweeping the reaction zone with an inert gas such as nitrogen. Preferably, the water is removed as a water/hydrocarbon azeotrope, even more preferably as a water/toluene azeotrope. The hydrocarbon can then be separated from the azeotrope by condensation in a suitable trap and can be recycled to the reaction mass. When this procedure is used, the temperature of the reaction mass can be easily held within the desired range by adjusting the concentration of toluene.

When the PPG-HAS reaction is finished, heating is stopped and the catalyst is removed from the reaction mass, by precipitation with calcium hydroxide in the case of a homogeneous catalyst, or by filtration in the case of a heterogeneous catalyst. The remaining material is then stripped of residual volatiles.

The resulting product is a viscous liquid having a number average molecular weight of 500–10,000, preferably 800–5000, and an oxygen/sulfur atom ratio of 3/1 or greater, preferably 5-60/1. Molecular weight can be varied by simply allowing the reaction to proceed until the desired molecular weight is reached.

The blends of unmodified PPG and PPG modified according to the invention can be made by simply mixing them in amounts which will give a mixture containing 0.4–20%, by weight, of the modified PPG.

A polyurethane can be prepared from a modified PPG of the invention, or from a modified-unmodified blend, by reacting it with an organic polyisocyanate and an aliphatic polyol or polyamine chain extender, as is well known in the art.

The polyisocyanates used in preparing the polyurethanes can be any of the aliphatic or aromatic polyisocyanates ordinarily used to prepare polyurethanes. "Polyisocyanate" means any compound bearing two or more —NCO radicals. Illustrative are 2,4-toluene diisocyanate
2,6-toluene diisocyanate
hexamethylene-1,6-diisocyanate
tetramethylene-1,4-diisocyanate
cyclohexane-1,4-diisocyanate
naphthalene-1,5-diisocyanate
diphenylmethane-4,4′-diisocyanate
xylylene diisocyanate
hexahydro xylylene diisocyanate
dicyclohexylmethane-4,4′-diisocyanate
1,4-benzene diisocyanate
3,3′-dimethoxy-4,4′-diphenyl diisocyanate
m-phenylene diisocyanate
isophorone diisocyanate
polymethylene polyphenyl isocyanate
4,4′-biphenylene diisocyanate
4-isocyanatocyclohexyl-4′-isocyanatophenyl methane
p-isocyanatomethyl phenyl isocyanate.

Mixtures of isocyanates can also be used.

The isocyanates preferred for use because of the desirable properties they confer on the polyurethane products are diphenylmethane-4,4′-diisocyanate and the toluene diisocyanates.

The chain extenders used in preparing the polyurethanes can be any of the aliphatic polyols, or any of the aliphatic or aromatic polyamines ordinarily used to prepare polyurethanes.

Illustrative of the aliphatic polyols which can be used as chain extenders are
1,4-butanediol
ethylene glycol
1,6-hexanediol
glycerine
trimethylolpropane
pentaerythritol
1,4-cyclohexane dimethanol
phenyl diethanolamine Diols like hydroquinone bis($\beta$-hydroxyethyl)ether, tetrachlorohydroquinone-1,4-bis($\beta$-hydroxyethyl)ether and tetrachlorohydroquinone-1,4-bis($\beta$-hydroxyethyl)sulfide, even though they contain aromatic rings, are considered to be aliphatic polyols for purposes of the invention.

Aliphatic diols of 2–10 carbon atoms are preferred. Especially preferred is 1,4-butanediol. Mixtures of diols can also be used.

Illustrative of the polyamines which can be used as chain extenders are p,p′-methylene dianiline and complexes thereof with alkali metal chlorides, bromides, iodides, nitrites and nitrates.
4,4′-methylene bis(2-chloroaniline)
dichlorobenzidine
piperazine
2-methylpiperazine
oxydianiline
hydrazine
ethylenediamine
hexamethylenediamine
xylylenediamine
bis(p-aminocyclohexyl)methane
dimethyl ester of 4,4′-methylenedianthranilic acid
p-phenylenediamine
m-phenylenediamine
4,4′-methylene bis(2-methoxyaniline)
4,4′-methylene bis(N-methylaniline)
2,4-toluenediamine
2,6-toluenediamine
benzidine
3,4′-dimethylbenzidine
3,3′-dimethoxybenzidine
dianisidine
1,3-propanediol bis(p-aminobenzoate)isophorone diamine
1,2-bis(2′-aminophenylthio)ethane.

The amines preferred for use are 4,4′-methylene bis(2-chloroaniline), 1,3-propanediol bis(p-aminobenzoate) and p,p′-methylenedianiline and complexes thereof with alkali metal chlorides, bromides, iodides, nitrites and nitrates. Mixtures of amines can also be used.

The polyurethanes can be prepared in two steps, the first of which is conducted under nitrogen at ambient pressure to prevent oxidation of the reactants and product, and to prevent exposure of the reaction mass to atmospheric moisture. In the first step, the modified PPG starting material is dried by heating it at a temperature of 80°–100° C. under vacuum, and is then held at 60°–125° C., preferably about 70°–90° C., while a stoichiometric excess, preferably twofold to tenfold, of organic polyisocyanate is added, with stirring. The actual amount of isocyanate used depends on the molecular weight of the modified PPG used, as is well known in the art. The reaction mass is held for about 1–4 hours at 60°–125° C., with stirring, and the free isocyanate content of the mass is then determined by titrating it with di-n-butylamine, as described in Analytic Chemistry of the Polyurethanes, Volume XVI, Part III, D. J.

David and H. B. Staley, Wiley-Interscience, 1969, pages 357-359.

In the second step, an amount of polyamine or polyol chain extender calculated to give an isocyanate/hydroxyl or amine mole ratio of about 0.9-1.1 to 1 in the reaction mass, preferably 1-1.05/1, is degassed at about 30°-120° C. and 1330-5330 Pa (10-50 mm Hg) pressure and quickly added to the reaction mass.

A conventional curing catalyst can be added at this point if desired. Illustrative of catalysts which can be used are dibutyltin dilaurate and stannous octoate. The catalyst can be added to the reaction mass to give a concentration of about 0.001-0.1%, by weight, preferably about 0.01%.

The reaction mass is held with stirring at 60°-130° C. until it is homogeneous, which normally takes 1-5 minutes. The mass is then poured into molds, preferably preheated to 100°-120° C., and then cured at about 100°-120° C. at a pressure of 1700-2500 kPa for from 5 minutes to several hours. The casting is then cooled, removed from the mold, aged for about one week at ambient temperature, and is then ready for use.

The polyurethanes can also be made by reaction-injection and liquid-injection molding techniques, whereby the starting materials are simultaneously injected and mixed in a mold, preferably together with a conventional polyurethane catalyst and then subjected to pressures ranging from ambient to several million pascals and temperatures ranging from ambient to 150° C. Use of a foaming agent such as a fluorocarbon or water is optional.

BEST MODE

In the following example, all parts are by weight.
The following were added to a reaction vessel fitted with a reflux condenser and a Dean Stark trap:

| Polypropylene glycol $\overline{M}_n$ 1225 | 122.5 parts |
| --- | --- |
| Toluene | 50 parts |
| $\beta,\beta'$-dihydroxyethyl sulfide | 5 parts |
| Methanesulfonic acid | 0.4 part |

The resulting mixture was heated to and held at reflux temperature for 7.5 hours, with stirring, while water was continuously removed from the reaction zone as the water/toluene azeotrope. During this interval, an additional 42.9 parts of $\beta,\beta'$-dihydroxyethyl sulfide were slowly added to the reaction mass over a six hour period. Samples removed at intervals during this process contained 8.6-14.3% of —O—CH$_2$—CH$_2$—S—CH$_2$—CH$_2$— moieties.

The catalyst was then neutralized with calcium hydroxide, filtered, and the volatiles removed from the remaining material at a pressure of about 667 Pa (5 mm of Hg) and a temperature of about 150° C., to give a viscous liquid product containing 22% of —O—CH$_2$—CH$_2$—S—CH$_2$—CH$_2$— moieties, with a number average molecular weight of 4500 and an oxygen/sulfur atom ratio of 7/1.

I claim:

1. Polypropylene ether glycol modified so that it contains in its chain 1-25%, by weight, of moieties represented by the structure

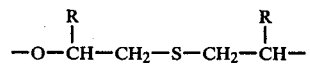

where R is hydrogen, an alkyl radical of 1-3 carbon atoms or phenyl, and the oxygen atom is linked to a hydrogen atom or a carbon atom.

2. The polypropylene ether glycol of claim 1 having an oxygen/sulfur atom ratio of 3/1 or greater.

3. The polypropylene ether glycol of claims 1 or 2 in which the moieties are represented by the structure —O—CH$_2$CH$_2$—S—CH$_2$CH$_2$—.

4. The copolyether glycol of claims 1, 2 or 3, which has a number average molecular weight of 500-10,000.

5. A mixture of unmodified polypropylene ether glycol and 0.4-20%, by weight of the mixture, of the polypropylene ether glycol of claim 1.

6. A mixture of unmodified polypropylene ether glycol and 0.4-20%, by weight of the mixture, of the polypropylene ether glycol of claim 2.

7. A mixture of unmodified polypropylene ether glycol and 0.4-20%, by weight of the mixture, of the polypropylene ether glycol of claim 3.

8. A mixture of unmodified polypropylene ether glycol and 0.4-20%, by weight of the mixture, of the polypropylene ether glycol of claim 4.

9. A polyurethane which is the reaction product of
(a) the polypropylene ether glycol of claim 1, 2, 3 or 4;
(b) an organic polyisocyanate; and
(c) a chain extender.

10. A polyurethane which is the reaction procuct of
(a) the mixture of claim 5, 6, 7 or 8;
(b) an organic polyisocyanate; and
(c) a chain extender.

* * * * *